United States Patent [19]

Kozey

[11] Patent Number: 4,973,405
[45] Date of Patent: Nov. 27, 1990

[54] FLOATING SUCTION HEAD ASSEMBLY

[76] Inventor: Gregory P. Kozey, Kozey Rd., Box 357, Eastford, Conn. 06242

[21] Appl. No.: 359,522

[22] Filed: Jun. 1, 1989

[51] Int. Cl.$^5$ ............................................. B01D 29/15
[52] U.S. Cl. ...................................... 210/238; 169/30; 210/242.1; 210/460; 210/483
[58] Field of Search ...................... 210/232, 242.1, 460, 210/463, 170, 459, 483, 238; 169/16, 13, 30

[56] References Cited

U.S. PATENT DOCUMENTS

| | | | |
|---|---|---|---|
| 950,715 | 3/1910 | Brindle | 210/463 |
| 1,621,413 | 3/1927 | James | 210/242.1 |
| 2,957,579 | 10/1960 | McCombie | 210/242.1 |
| 3,109,812 | 11/1963 | McAulay et al. | 210/242.1 |
| 3,782,552 | 1/1974 | Wendell | 210/242.1 |
| 3,794,446 | 2/1974 | Ost | 210/242.1 |
| 4,179,379 | 12/1979 | Mitchell | 210/242.1 |
| 4,310,423 | 1/1982 | Brown et al. | 210/242.1 |
| 4,357,238 | 11/1982 | Ziaylek, Jr. | 210/460 |
| 4,647,374 | 3/1987 | Ziaylek et al. | 210/242.1 |

Primary Examiner—Frank Spear
Assistant Examiner—Joseph Drodge
Attorney, Agent, or Firm—McCormick, Paulding & Huber

[57] ABSTRACT

A floating suction head assembly for connection with firehoses and the like comprising a U-shaped float of hollow tubular construction. A hollow tubular strainer is disposed between the arms of the float and extends therebeneath with small openings fully exposed at its bottom and along side portions thereof. The openings are one half inch in diameter with spacing therebetween of approximately one fourth inch and with alternate radial rows of 9 and 8 openings each. Thirty-two rows of openings are provided along the length of the strainer and a highly efficient turbulence free operation results with a lightweight construction.

11 Claims, 2 Drawing Sheets

FLOATING SUCTION HEAD ASSEMBLY

BACKGROUND OF THE INVENTION

The present invention relates generally to an improved floating suction head assembly of the type employed by firemen in the absence of a convenient fire hydrant and Where the suction head may be disposed on the surface of a pond, lake, stream, swimming pool etc. from which Water can be pumped. U.S. Pat. No. 4,647,374 to Michael P Ziaylek et al discloses a suction head of the type mentioned.

It is the general object of the present invention to provide an improved floating suction head assembly which is highly efficient in operation and yet extremely low in weight and which avoids the creation of turbulence and whirl pooling in use.

SUMMARY OF THE INVENTION

In fulfillment of the foregoing general object, an improved floating suction head assembly is provided for connection with fire hoses and the like and comprises a float which is generally U-shaped viewed from above in an operational or floating attitude on the surface of a pond, stream, swimming pool etc. The body and each arm of the "U" shaped float are of sealed holloW construction and are preferably generally cylindrical and fabricated of aluminum alloy or a similar durable light Weight material. An elongated holloW generally cylindrical strainer is open at one end and adapted for connection with the suction end of a firehose or the like and is closed at an opposite end. The strainer is disposed generally in a horizontal attitude and at least partially betWeen the arms of the U-shaped float with its closed end adjacent the body portion of the float. A means for detachably pivotally interconnecting the strainer and the float is provided adjacent the closed end of the former and the strainer is thus pivotally moveable with the open end thereof swingable downwardly relative to the float. Thus, a connected firehose or the like will describe a shallow arc beneath the surface of the water due to its own weight and the weight of water therewithin and will pivot the strainer downwardly with the float remaining in a horizontal position on the surface of the water.

The strainer is also preferably fabricated of aluminum alloy or the like and is of a hollow tubular construction with a plurality of small openings along and throughout its lower surface and extending upwardly along each side thereof throughout an angle of at least 60° from a vertical plane at the longitudinal centerline of the strainer. In preferred form, the small openings extend through an angle of approximately 90° from the vertical plane through the longitudinal centerline of the strainer and thus provide a perforate area with an included angle of approximately 180°. The strainer is arranged With its lower portion disposed beneath the lower surface of the float so that substantially all of its openings are exposed at all times below the float portion of the suction head. Thus, water may be drawn downwardly about the arcuate outer surfaces of the float and will flow smoothly into the side openings in the strainer as Well as the lowermost openings therein. Turbulence and whirl pooling and the attendant entrapment of air with detrimental effect on pumps etc. is thus positively avoided.

Preferably, a stop means is provided for limiting the downward pivotal movement of the strainer and a specific arrangement and dimensional relationship of strainer openings is provided for. That is the openings are approximately one half inch in diameter and the spacing therebetween is no more than one half inch. More specifically, the spacing is less than one quarter inch between the openings with the openings arranged alternately in radially extending rows of 9 and 8 each. There are preferably between 20 and 40 radial rows of openings in the strainer and in the preferred embodiment approximately 32 radial rows of openings are provided.

DESCRIPTION OF THE PREFERRED EMBODIMENT

Figure 1:
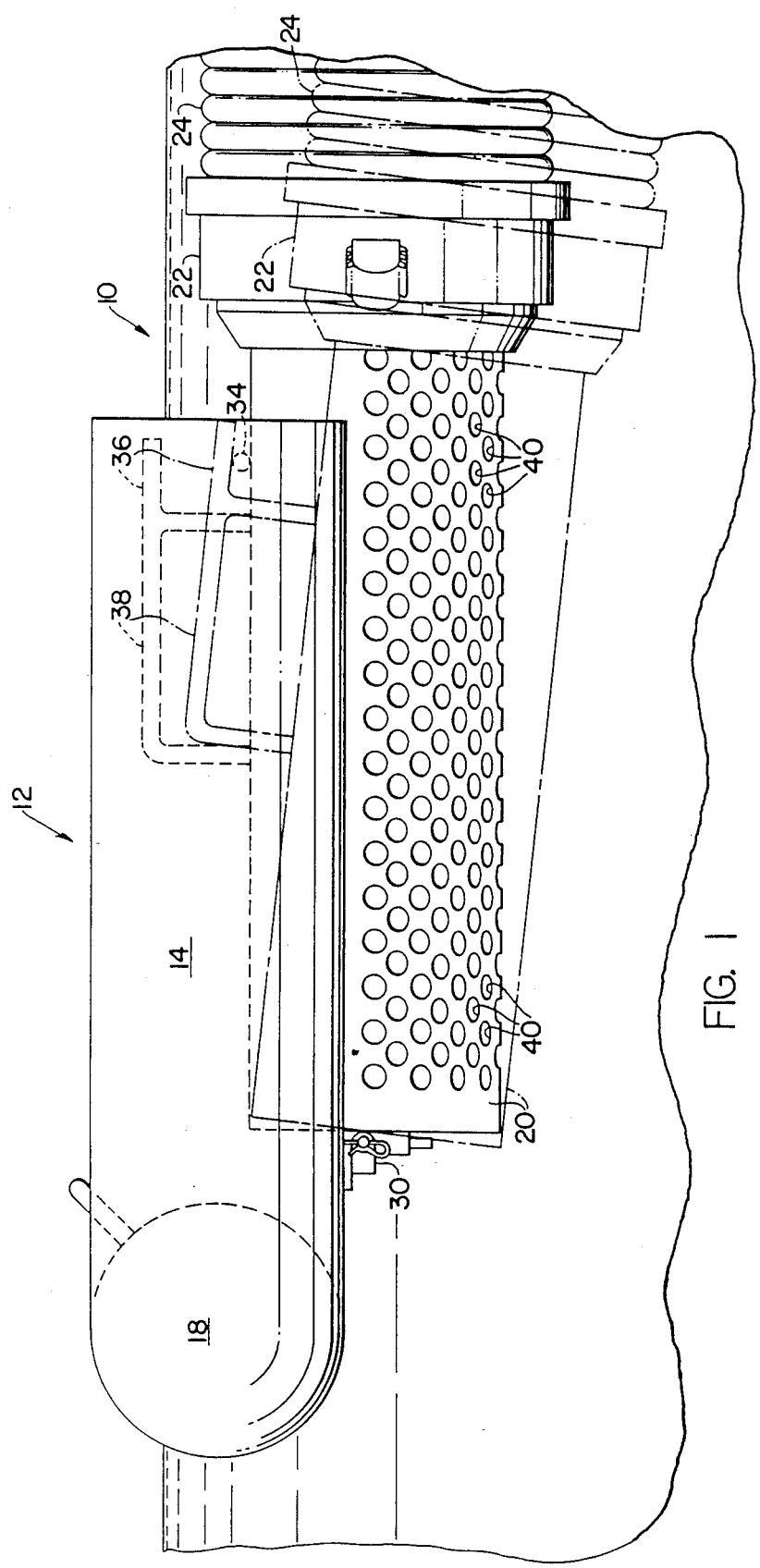
FIG. 1 of the drawings is a side elevational view of the Improved Floating Suction Head Assembly of the present invention floating in a body of water and with the strainer shown in both horizontal and downwardly pivoted attitudes.
Figure 2:
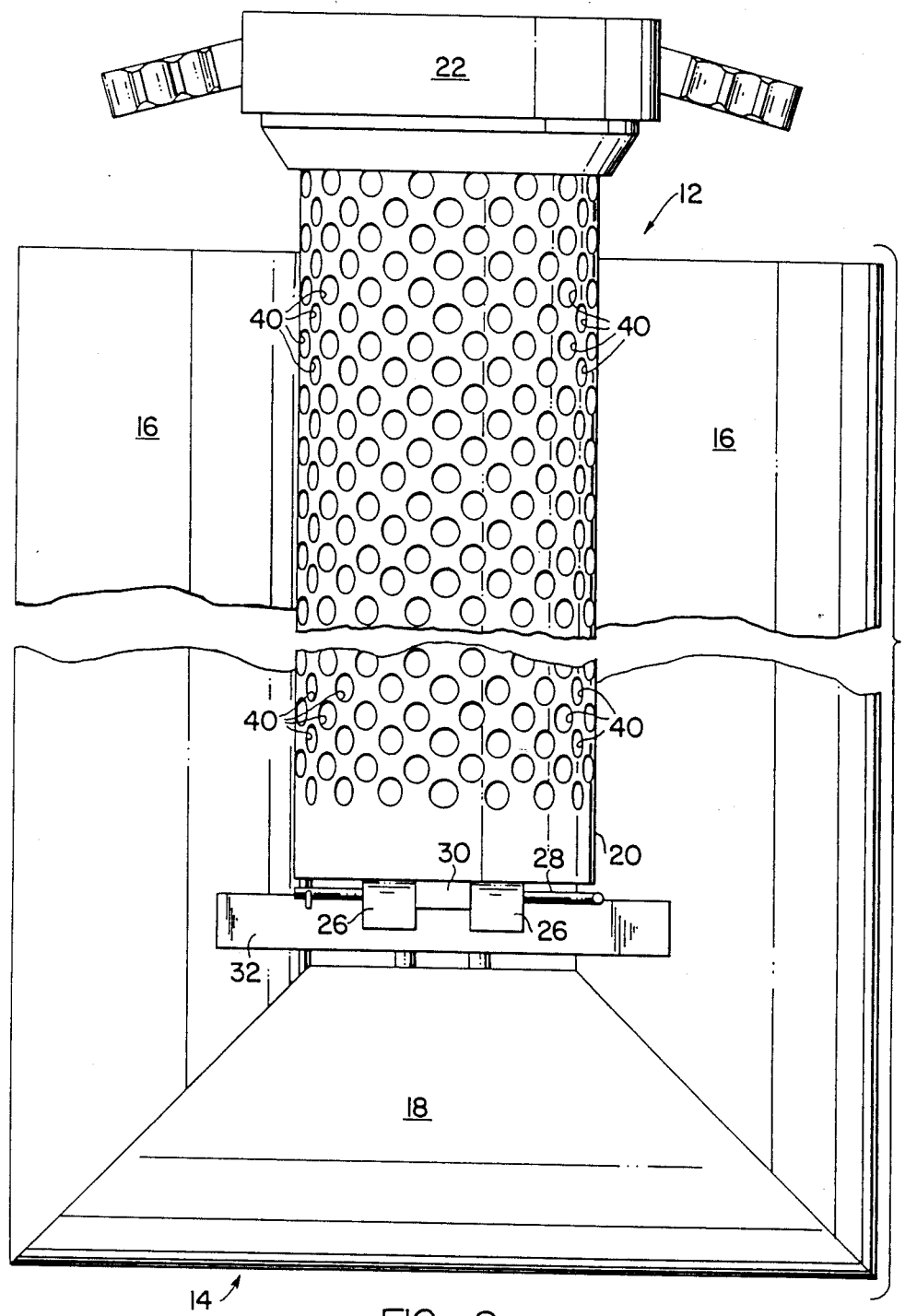
FIG. 2 is a bottom view of the FLOATING SUCTION HEAD ASSEMBLY of the present invention.

Referring particularly to FIG. 1, a body of water is partially illustrated at 10 with an improved floating suction head assembly constructed with accordance with the present invention indicated generally at 12. The suction head assembly is shown in a floating attitude partially exposed above the surface of the water 10 with its strainer in full line horizontal position and in broken line in a downwardly pivoted position. As best illustrated in FIG. 2, the suction head assembly comprises a float 14 Which is generally U-Shaped with similar spaced apart arms 16, 16 and a body or body portion 18 interconnecting the former. As shown and as presently preferred, the body and each arm in the U-shaped float are of a sealed hollow construction of aluminum alloy or other light Weight material.

An elongated hollow generally cylindrical strainer 20 is open at one end and adapted for connection With the suction end of a firehose or the like. More particularly, the strainer 20 is shown With a "quick-connect" collar 22 at an open right hand end portion thereof for connection with a firehose or the like at 24. That is, the collar 22 may be internally threaded for connection with a complimentary externally threaded portion of the firehose 24.

At a left hand and closed end portion of the strainer 20, a means is provided for pivotally interconnecting the strainer and the float and such means may comprise a pair of brackets 26, 26 best illustrated in FIG. 2 and cooperating with a pivot pin 28. The pivot pin 28 takes an L-shape as shoWn With a small pin 30 securing the same in position through appropriate openings in the brackets 26, 26. The brackets 26, 26 reside adjacent a bracket 30 which is also suitably bored to receive the pivot pin 28 and which is held on a cross bar 32 secured at its ends to the arm 16, 16 of the float 14. As will be apparent, the strainer 20 may be readily swung between the positions shown in FIG. 1 about the pivot pin 28. Alternatively, the pivot pin 28 may be removed accommodating removal of the strainer 20 for use at the end of the hose 24 independently of the float 14. For example, the strainer may then be dropped to the bottom of a pond, stream, swimming pool etc. for the suction of water therethrough.

As will also be apparent in FIG. 1, a cross bar 34 shown in broken line cooperates with a projecting end portion 36 of a handle 38 also shown in broken line. The bar 34 and portion 36 limit the downward pivoting movement of the strainer 20 relative to the float 14. If the strainer is allowed to assume an extreme downward position, particularly in a shallow pond, there may be a greater likelihood of suction of muck etc. For the bottom of the pond. The handle 38 may of course also be employed in moving the suction head assembly from a firetruck to a pond, stream etc. The stop bar 34 may be secured between the arm 16, 16 by welding or other suitable means.

In accordance with the present invention, the strainer 20 is provided with a plurality of small openings along and throughout its lower surface and extending upwardly along each side thereof throughout an angle of at least 60° from a vertical plane through a longitudinal centerline of the strainer. As best seen in FIG. 1, the openings 40, 40 extend upwardly about the sides of the strainer 20 through at least 80° from a vertical plane through the longitudinal centerline of the strainer and, more specifically, the said openings extend through an angle of approximately 90°. That is, the upwardmost row of openings 40, 40 resides approximately at the mid point of the strainer on both sides thereof so as to define an included angle of perforate area of approximately 180°. It will also be apparent in FIG. 1 that the uppermost row of openings 40, 40 is freely exposed beneath the float 14 as are all openings therebelow. That is, the strainer 20 is disposed so that approximately its lower half is exposed beneath the float 14 even when the strainer is in the upper or horizontal position shown in full line in FIG. 1. When the strainer is in its downwardly pivoted position all openings are of course also exposed beneath the float 14. This arrangement of the strainer and the openings therein relative to the float 14 contributes, together with the particular configuration and dimensions of the openings, to the highly efficient operation of the improved floating suction head Assembly of the present invention. The water Which is drawn downwardly about the float 14 and/or inwardly toward the side openings 40, 40 in the strainer passes over the gradual arcuate lower surfaces of the cylindrical arms and body of the float into the openings and Water drawn from beneath the strainer of coûrse also passes freely through the loWermost openings therein. Thus, turbulence and whirl pooling of the water about the suction head is minimized and air entrapment is avoided as might otherwise result in detrimental effect on the pump and/or the efficiency of discharge from the firehose downstream of the pump.

As mentioned, the size and arrangement of the openings 40, 40 also contributes to the efficient turbulence free operation of the strainer. Preferably and as shown, the openings 40, 40 are approximately one half inch in diameter and the spacing therebetween is substantially less than one half inch and, preferably, less than one quarter inch. The openings 40, 40 are arranged alternately in radially extending rows of 9 and 8 each although only 8 and 7 openings are shown in each radial extending row in FIG. 2. Preferably, there are between 20 and 40 radial rows of openings in the strainer and in the presently preferred form there are approximately 32 radial rows of such openings.

From the foregoing, it will apparent that the arrangement of the strainer relative to the float together with the arrangement and dimensions of the openings in the strainer results in improved and highly efficient operation of the Floating Suction Head Assembly of the present invention. Turbulence and whirl pooling is avoided as mentioned. Moreover, the hollow, lightweight construction of the suction head throughout results in a weight reduction of as much as 100% over prior suction heads, as for example in the case of the device of the aforementioned patent.

I claim:

1. A floating suction head assembly for connection with fire hoses and the like comprising a float which is generally "U-shaped" viewed from above in an operational or floating attitude, the body and each arm of the "U" being of horizontally elongated sealed hollow cylindrical construction, an elongated hollow generally cylindrical strainer open at one end and adapted for connection with the suction end of a fire hose or the like and closed at an opposite end, said strainer being disposed generally in a longitudinal attitude with its axis generally horizontal between the arms of the "U-shaped" float and with its closed end adjacent the body of the float, and means pivotally interconnecting the strainer and float adjacent the closed end of the former, the strainer thus being pivotally movable with the open end thereof swingable downwardly relative to the float at the urging of a connected fire hose or the like, the latter describing a shallow arc under the water surface due to its own weight, and said strainer having a plurality of small openings therein along and throughout its arcuate lower surface and extending upwardly along each arcuate side thereof through an angle of at least 80° from a vertical plane through the axis of the strainer, turbulence and whirl-pooling of the water about the suction head thus being minimized.

2. A floating suction head assembly for fire hoses and the like as set forth in claim 1 Wherein said openings extend through an angle of approximately 90° from said vertical plane whereby to define a perforate area with an included angle of about 180.

3. A floating suction head assembly for fire hoses and the like as set forth in claim 1 wherein the openings in the strainer are circular and approximately one-half inch in diameter.

4. A floating suction head assembly for fire hoses and the like as set forth in claim 3 wherein spacing between the openings is no more than one-half inch.

5. A floating suction head assembly for fire hoses and the like as set forth in claim 4 wherein the spacing between openings is no more than one-quarter inch.

6. A floating suction head assembly for fire hoses and the like as set forth in claim 3 wherein the openings are arranged alternately in radially extending rows of nine and eight each.

7. A floating suction head assembly for fire hoses and the like as set forth in claim 3 wherein there are between 20 and 40 radial rows of openings in the strainer.

8. A floating suction head assembly for fire hoses and the like as set forth in claim 3 wherein there are approximately 32 radial rows of openings.

9. A floating suction head assembly for fire hoses and the like as set forth in claim 1 wherein the strainer is arranged with substantially all of its openings exposed to the water at all time the float of the suction head.

10. A floating suction head assembly for fire hoses and the like as set forth in claim 1 and including a stop means for limiting the downWard pivotal movement of the strainer.

11. A floating suction head assembly for fire hoses and the like as set forth in claim 1 wherein said means for pivotally interconnecting the strainer and float provides for detachability of the strainer from the float.

* * * * *